(12) United States Patent  
Anderson et al.

(10) Patent No.: US 7,513,474 B2  
(45) Date of Patent: Apr. 7, 2009

(54) SYSTEMS AND METHODS FOR MOUNTING FLAT PANEL VIDEO DISPLAYS

(75) Inventors: David Anderson, Mesa, AZ (US); Tom Muday, Scottsdale, AZ (US); Flavio Ly Hau, Tempe, AZ (US)

(73) Assignee: Omnimount Systems, Inc., Phoenix, AZ (US)

( * ) Notice: Subject to any disclaimer, the term of this patent is extended or adjusted under 35 U.S.C. 154(b) by 0 days.

(21) Appl. No.: 11/517,955

(22) Filed: Sep. 6, 2006

(65) Prior Publication Data

US 2007/0120032 A1    May 31, 2007

Related U.S. Application Data

(60) Provisional application No. 60/714,315, filed on Sep. 6, 2005.

(51) Int. Cl.  
*E04G 3/00* (2006.01)
(52) U.S. Cl. ..................... 248/284.1; 248/922
(58) Field of Classification Search .............. 248/278.1, 248/279.1, 281.11, 281.1, 283.1, 284.1, 285.1, 248/286.1, 920, 921, 922, 291.1  
See application file for complete search history.

(56) References Cited

U.S. PATENT DOCUMENTS

| | | | | |
|---|---|---|---|---|
| 2,967,035 A | * | 1/1961 | Simons ...................... | 248/486 |
| 4,185,801 A | * | 1/1980 | Plymoth ................... | 248/282.1 |
| 4,470,106 A | * | 9/1984 | Norton ....................... | 362/398 |
| 5,201,896 A | * | 4/1993 | Kruszewski ............. | 248/278.1 |
| 6,484,987 B2 | * | 11/2002 | Weaver ..................... | 248/278.1 |
| 2002/0033436 A1 | * | 3/2002 | Peng et al. ................ | 248/284.1 |
| 2006/0261228 A1 | * | 11/2006 | Hung ....................... | 248/282.1 |
| 2007/0170326 A1 | * | 7/2007 | Timm et al. ............ | 248/281.11 |

* cited by examiner

*Primary Examiner*—Ramon O Ramirez  
(74) *Attorney, Agent, or Firm*—Hogan & Hartson LLP (57) ABSTRACT

Systems and methods for mounting flat panel video displays are disclosed herein. Several aspects of the invention are directed to a mounting assembly for adjustably mounting a flat panel video display. The mounting assembly can be carried by a mounting device attached to a support medium (e.g., a wall or other support structure). The mounting assembly includes a first body portion and a second body portion. The mounting assembly also includes a first link and a second link spaced apart from the first link to operably couple the first body portion to the second body portion. The first and second links are positioned to cooperatively move relative to each other to pivotably move the first body portion relative to the second body portion. The mounting assembly also includes a slot in the first and/or second body portions and a locking mechanism received within the slot to releasably hold the first and second body portions in position relative to each other.

28 Claims, 5 Drawing Sheets

SYSTEMS AND METHODS FOR MOUNTING FLAT PANEL VIDEO DISPLAYS

CROSS-REFERENCE TO RELATED APPLICATION

The present application claims priority to pending U.S. Provisional Application No. 60/714,315, filed Sep. 6, 2005, and incorporated herein in its entirety by reference.

TECHNICAL FIELD

The present invention is related to systems and methods for mounting flat panel video displays to a wall or other support medium. More particularly, several embodiments of the invention are directed to mounting devices including adjustable mounting assemblies and methods for using such mounting devices to adjustably support flat panel video displays.

BACKGROUND

Flat panel video displays, such as plasma televisions, LCD displays, and the like, are becoming very popular. As a result, flat panel video displays are used in a wide variety of viewing areas from family rooms to boardrooms. Many manufacturers are accordingly entering into this segment of the market with many different models of video displays that have different shapes and sizes. As such, there is also a vast array of different mounting devices (e.g., floor stands, wall mounts, and/or ceiling brackets) and mounting techniques to secure flat panel video displays to walls or other support mediums.

Most traditional mounting devices allow a viewer to tilt or otherwise adjust the relative location of video displays for optimum viewing performance. Because many video displays and corresponding mounting devices can be relatively heavy, one concern with adjusting the location of the video displays is the force required to move the video displays to the desired location. One approach to overcome this problem is tilting or adjusting a video display about the center of gravity of the video display and corresponding mounting device to (a) minimize the force required to balance and/or position the video display, and (b) reduce the force required to hold the video display in the desired position after adjustment. One conventional mounting device for adjusting the location of a flat panel video display, for example, includes a mounting assembly having a single fixed pivot point proximate the center of gravity of the video display and the corresponding mounting device. The video display can be moved about the single pivot point for adjustment.

One drawback with this approach is that as the video display is pivoted to the outer extremes of its range of movement, the defined center of gravity (and, accordingly, the pivot point) can move substantially away from the actual center of gravity of the assembly. As such, an excessive amount of force may be required to hold the video display in the desired positions at such at such extreme ranges. Furthermore, it may be difficult to prevent inadvertent movement of the video display at such outer extremes because of the force required to hold the video display in place. Accordingly, there is a need to improve the systems and methods for mounting flat panel video displays.

DETAILED DESCRIPTION

A. Overview

The following disclosure describes several embodiments of mounting devices including adjustable mounting assemblies and methods for using such mounting devices to adjustably support flat panel video displays. Several aspects of the invention are directed to a mounting assembly for adjustably mounting a flat panel video display. The mounting assembly can be carried by a mounting device attached to a support medium (e.g., a wall or other support structure). The mounting assembly includes a first body portion and a second body portion. The mounting assembly also includes a first link and a second link spaced apart from the first link to operably couple the first body portion to the second body portion. The first and second links are positioned to cooperatively move relative to each other to pivotably move the first body portion relative to the second body portion. The mounting assembly also includes a slot in the first and/or second body portions and a locking mechanism received within the slot to releasably hold the first and second body portions in position relative to each other.

Another aspect of the invention is directed toward a method for mounting a flat panel video display. The method includes releasably attaching a video display to a mounting assembly. The mounting assembly includes (a) a first body portion, (b) a second body portion proximate to the first body portion with the first body portion between the video display and the second body portion, and (c) a first link and a second link operably coupling the first body portion to the second body portion. The method further includes moving the video display to a desired location by pivotably moving the video display about a plurality of pivot points. The individual pivot points are approximately at a center of gravity point for a particular arrangement of the video display and the mounting assembly.

Many specific details of certain embodiments of the invention are set forth in the following description and in FIGS. 1-4 to provide a thorough understanding of these embodiments. Well-known structures, systems, and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
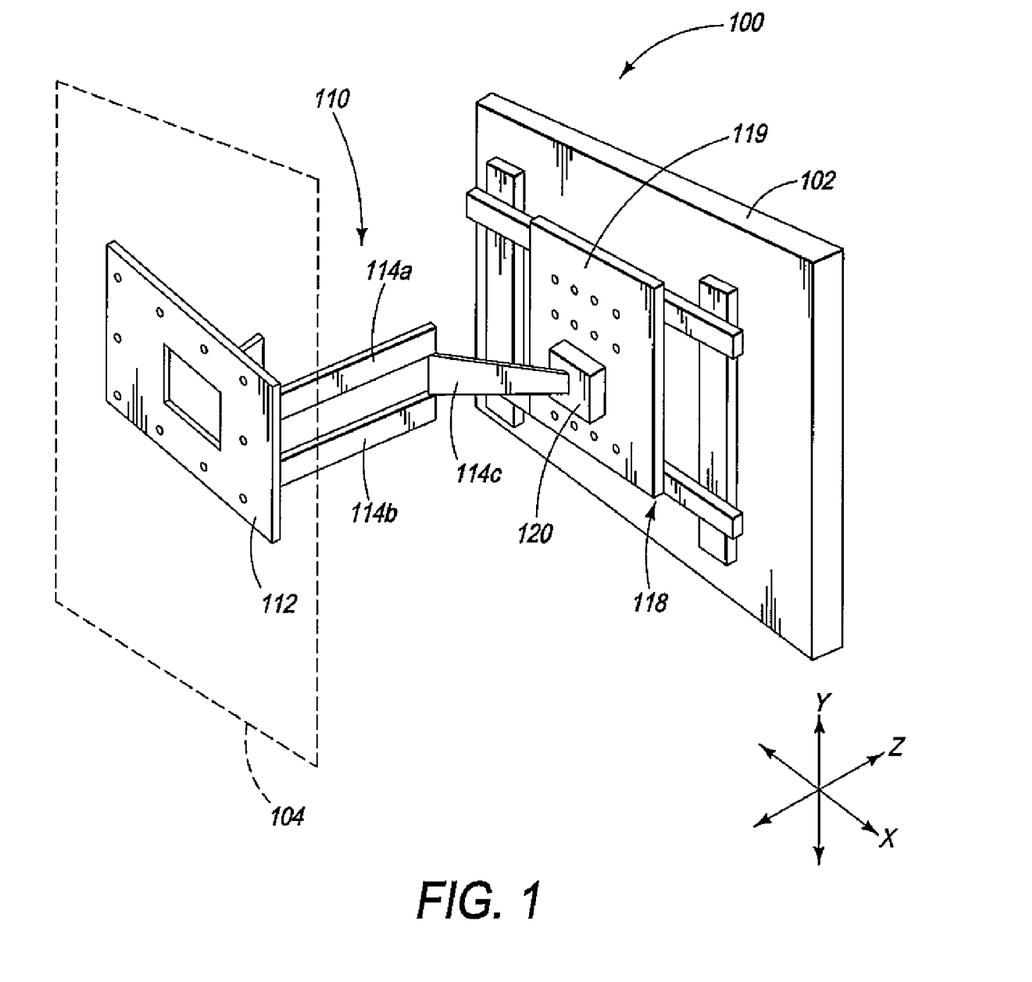
FIG. 1 is a partially schematic, isometric view of a system for adjustably mounting a flat panel video display to a support medium in accordance with an embodiment of the invention.

B. Embodiments of Mounting Systems Including Adjustable Mounting Devices for Supporting Flat Panel Video Displays FIG. 1 is a partially schematic isometric view of a system 100 for adjustably mounting a flat panel video display 102 to a support medium 104 (shown in broken lines) in accordance with an embodiment of the invention. The system 100 can include a mounting device 110 attached to the support medium 104 (e.g., a wall or other structure) for adjustably supporting the video display 102. The mounting device 110 includes a mounting assembly 120 (shown schematically) pivotably attached to the video display 102. The mounting assembly 120 is configured to allow the video display 102 to pivotably move about a plurality of different pivot points (as discussed in more detail below with respect to FIGS. 2A and 2B) to move the video display 102 (i.e., adjust the pitch of the video display) to a desired viewing position. Because the mounting assembly 120 can pivotably move the video display 102 about a number of pivot points, in many cases the mounting assembly 120 can require less force to move the video display 102 to a desired position and/or hold the video display 102 at the desired position as compared with the conventional mounting devices described previously.

The mounting device 110 in the illustrated embodiment also includes a wall attachment portion 112 fixedly attached to or otherwise engaged with the support medium 104. The wall attachment portion 112 can be secured to the support medium 104 at a desired location using a plurality of fasteners (not shown). The mounting device 110 further includes one or more mounting arms 114 (three are shown as mounting arms 114a-c) extending between the wall attachment portion 112 and the adjustable mounting assembly 120. The mounting arms 114a-c are configured to pivotably move the video display 102 in an x- and/or a z-direction to a desired location. The mounting assembly 120 of the mounting device 110 is operably coupled to the video display 102 using a display attachment portion 118. The display attachment portion 118 is configured to correspond to the make and model of the video display 102. The display attachment portion 118, for example, can include an adapter plate 119 configured to be attached to a particular model of video display 102. Suitable mounting devices 110, display attachment portions 118, and adapter plates 119 are commercially available from Omni-Mount Systems of Phoenix, Ariz.

Figure 2A:
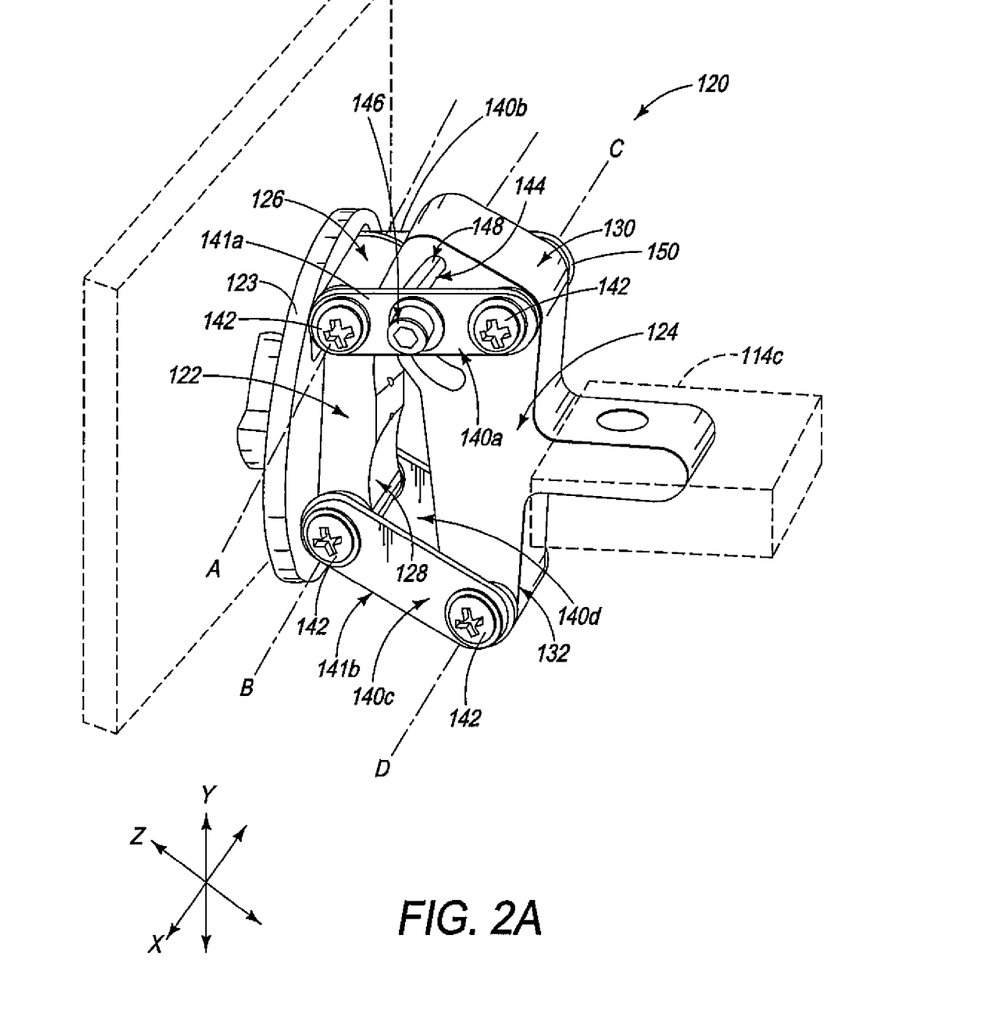
FIG. 2A is an isometric view of an adjustable mounting assembly in accordance with an embodiment of the invention.

FIG. 2A is an isometric view of the adjustable mounting assembly 120 of the mounting device 110 (FIG. 1) in accordance with one embodiment of the invention. The mounting assembly 120 can include a first body portion 122 and a second body portion 124 coupled to the first body portion 122. The first body portion 122 is a front plate that includes an engagement plate 123 engaged with or otherwise coupled to the display attachment portion 118 (shown schematically in broken lines). The second body portion 124 is a back plate including a portion operably coupled to the mounting arm 114c (shown schematically in broken lines). In operation, the second body portion 124 is generally stationary and the first body portion 122 is pivotably movable relative to the second body portion 124. In other embodiments, however, the first and second body portions 122 and 124 can both be movable relative to each other.

The first body portion 122 includes a first attachment portion 126 and a second attachment portion 128. The first and second attachment portions 126 and 128 each extend through at least a portion of the first body portion 122 along an attachment axis A and an attachment axis B, respectively. The second body portion 124 includes a third attachment portion 130 and a fourth attachment portion 132. The third and fourth attachment portions 130 and 132 extend through at least a portion of the second body portion 124 along an attachment axis C and an attachment axis D, respectively. The attachment axes A-D generally extend in the x-direction and, as discussed below, the mounting assembly 120 can pivotably move about each of the attachment axes A-D. In other embodiments, the attachment portions 126/128/130/132 can have different configurations and/or different positions on the first and second body portions 122 and 124 of the mounting assembly 120.

The mounting assembly 120 further includes a plurality of attachment members or pivot arms 140 (four are shown as attachment members 140a-d) coupling the first body portion 122 to the second body portion 124. The first and second attachment members 140a and 140b form a first link 141a extending between the first attachment portion 126 on the first body portion 122 and the third attachment portion 130 on the second body portion 124. The third and fourth attachment members 140c and 140d form a second link 141b extending between the second attachment portion 128 and the fourth attachment portion 132. The attachment members 140a-d can be attached to the corresponding first and second body portions 122 and 124 using fasteners 142 (e.g., bolts, screws, rivets, or other suitable fasteners). In the illustrated embodiment, the attachment members 140a-d each have the same dimensions. In other embodiments, however, the individual attachment members 140a-d may have different dimensions (e.g., different lengths). As described in more detail below, the first body portion 122, second body portion 124, and attachment members 140a-d are accordingly configured as a four-bar linkage that moves about the attachment axes A-D and allows the mounting assembly 120 to define a number of different pivot points about which the video display 102 (FIG. 1) can be pivotably adjusted.

The second body portion 124 of the mounting assembly 120 also includes one or more slots 144 (only one is shown in the embodiment illustrated in FIG. 2A) having a generally constant radius of curvature. A locking mechanism 146 (e.g., a fastener or other suitable locking mechanism) extends through the first and third attachment members 140a and 140c and the slot 144. As such, movement of the first link 141a (i.e., the first and second attachment members 140a and 140b) is constrained along the slot 144 between a first portion 148 of the slot 144 and a second portion 150 of the slot 144. The locking mechanism 146 is configured to releasably hold the first link 141a at a desired location with respect to the slot 144. In other embodiments described below with respect to FIGS. 3 and 4, the slot can have a different arrangement on the mounting assembly and/or the mounting assembly can include more than one slot.

Figure 2B:
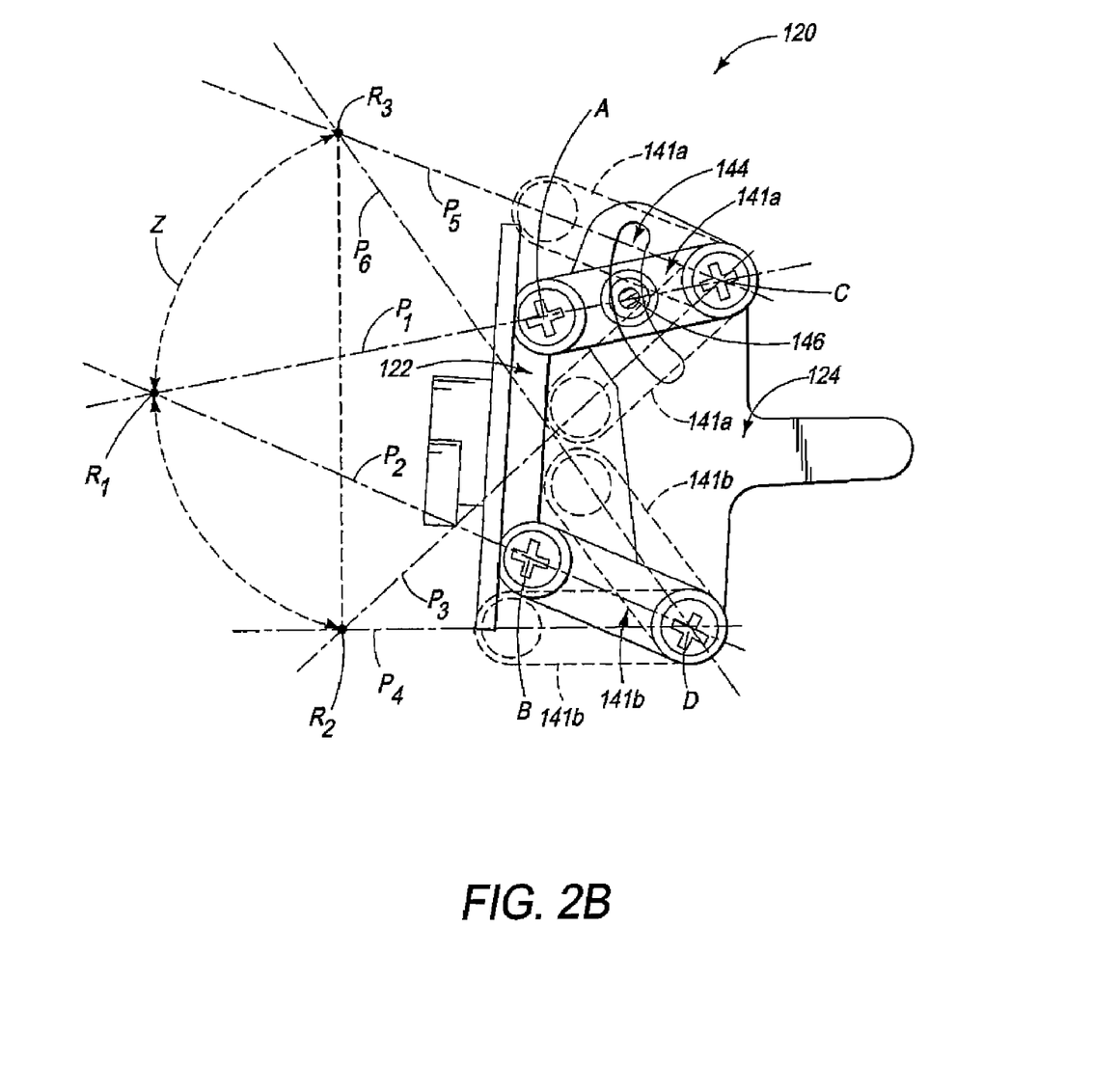
FIG. 2B is a side cross-sectional view of the adjustable mounting assembly of FIG. 2A.

FIG. 2B is a side cross-sectional view of the adjustable mounting assembly 120 of FIG. 2A. As best seen in FIG. 2B, a first pivot axis $P_1$ extends lengthwise along a medial portion of the first link 141a and a second pivot axis $P_2$ extends lengthwise along a medial portion of the second link 141b. The first and second pivot axis $P_1$ and $P_2$ intersect at a first pivot point $R_1$. The first pivot point $R_1$ (as well as the plurality of pivot points described below) is the point about which the video display 102 (FIG. 1) can be pivotably adjusted to move the video display to a desired position. The multiple pivot points defined by the pivot axes extending along the medial portions of the first and second links 141a and 141b roughly approximate a forward center of gravity of the video display 102 and mounting device 110 (FIG. 1).

In operation, the first and second links 141a and 141b that make up the four-bar linkage described above can be moved to a number of different operational positions. More specifically, the first link 141a can move along the slot 144 to various positions, and the second link 141b can move relative to the first link 141a. The locking mechanism 146 can releasably hold the mounting assembly 120 in a desired operational position. For example, in one operational position (shown in broken lines) a third pivot axis $P_3$ and a fourth pivot axis $P_4$ intersect at a second pivot point $R_2$. At another operational position (also shown in broken lines), a fifth pivot axis $P_5$ and a sixth pivot axis $P_6$ intersect at a third pivot point $R_3$. A number of additional pivot points can be defined throughout a pivot zone Z (shown in broken lines). The mounting assembly 120 is accordingly configured to provide a plurality of pivot points within the pivot zone Z such that the pitch of the video display 102 (FIG. 1) can be adjusted relative to a number of different pivot points, as opposed to just a single pivot point.

One advantage of this feature is that less force may be required to hold the video display 102 (FIG. 1) in place as compared with conventional mounting assemblies, particularly when the video display is moved to the outer extremes of its range of movement. For example, when the video display 102 is pivoted about the pivot points $R_2$ or $R_3$, the amount of force required by the locking mechanism 146 to hold the mounting assembly 120 in the desired configuration can be less than the amount of force required to hold a conventional mounting assembly in place at the same position. Another advantage is that it may require less force to move and/or adjust the video display 102 using the mounting assembly 120 as compared with moving the video display using conventional mounting assemblies.

Figure 3:
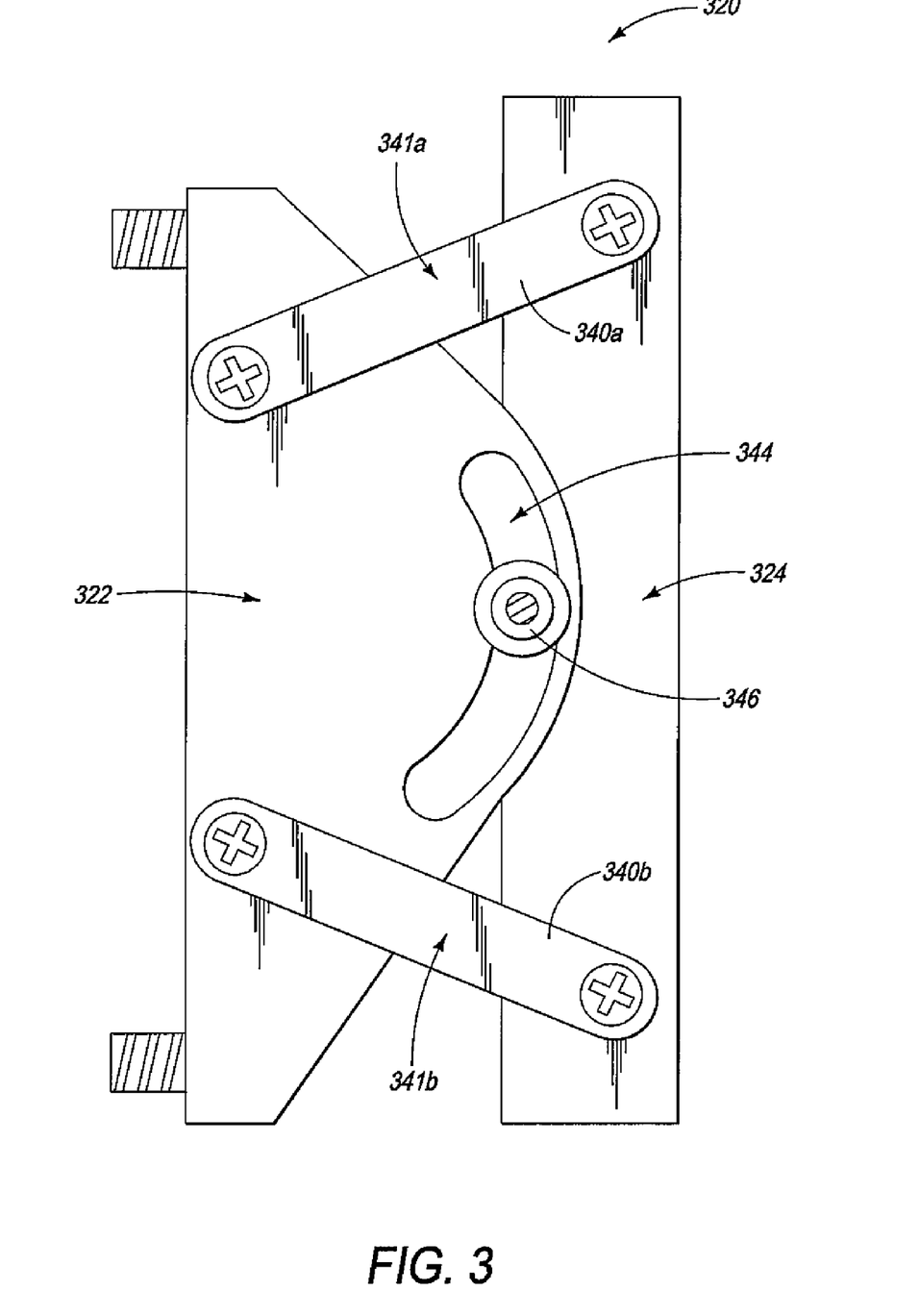
FIG. 3 is a side cross-sectional view of an adjustable mounting assembly in accordance with another embodiment of the invention.
Figure 4:
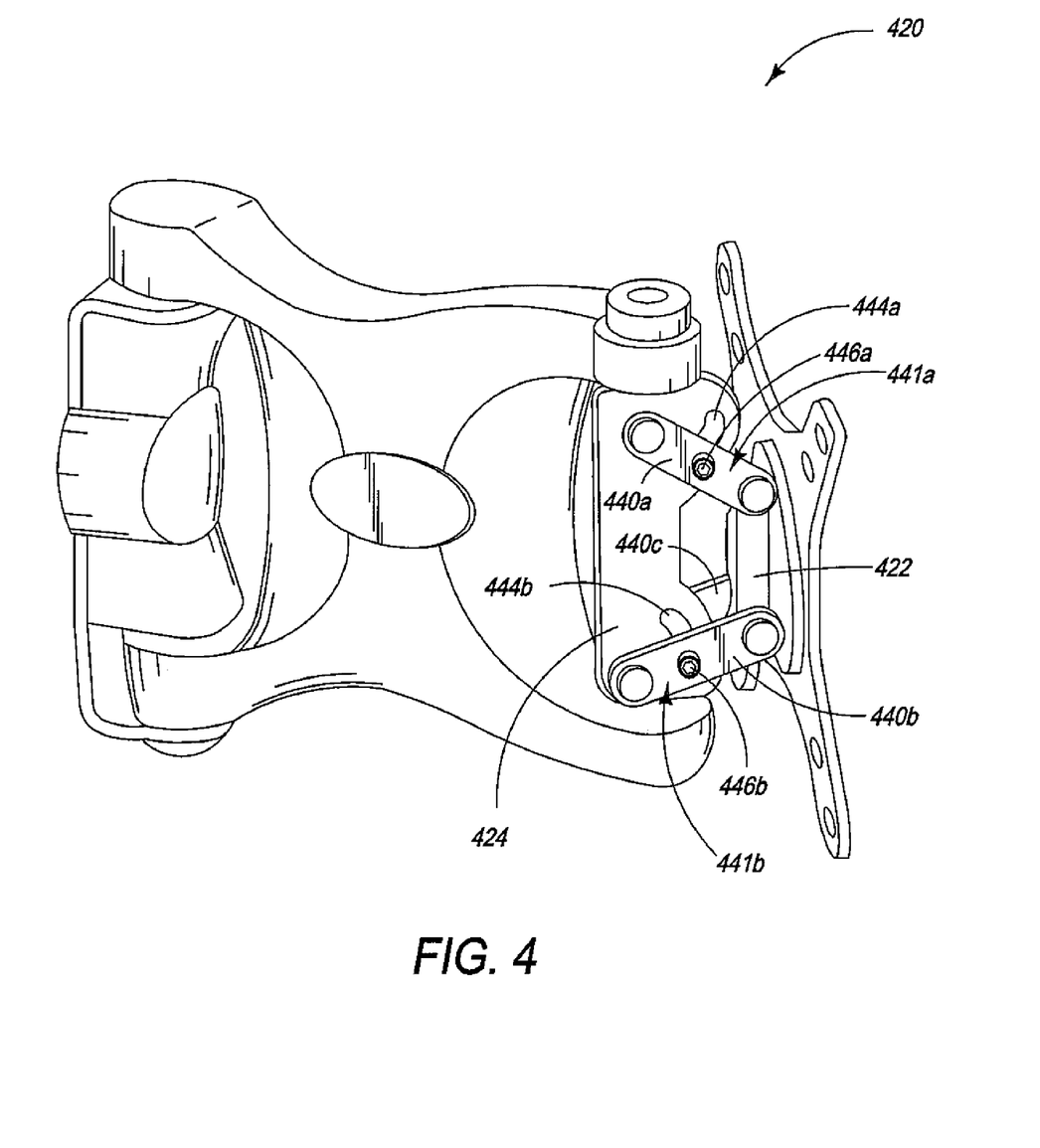
FIG. 4 is an isometric view of an adjustable mounting assembly in accordance with still another embodiment of the invention.

C. Additional Embodiments of Adjustable Mounting Devices for Supporting Flat Panel Video Displays FIGS. 3 and 4 illustrate additional embodiments of mounting assemblies that can be used with the system 100 described above with respect to FIG. 1. The mounting assemblies described below with respect to FIGS. 3 and 4 can include many features generally similar to the mounting assembly 120 described above and can have many of the same advantages as the mounting assembly 120.

FIG. 3 is a side cross-sectional view of an adjustable mounting assembly 320 in accordance with another embodiment of the invention. The mounting assembly 320 includes a first body portion 322 and a second body portion 324. The first and second body portions 322 and 324 are operably coupled together using a first link 341a and a second link 341b. The first and second links 341a can be generally similar to the first and second links 141a and 141b described above with respect to FIGS. 2A and 2B. For example, the first link 341a and second link 341b each include two attachment portions (only two attachment portion 340a and 340b are shown) to form a four-bar linkage.

The mounting assembly 320 also includes a slot 344 having a generally constant radius of curvature and a locking mechanism 346 within the slot 344. The slot 344 in the mounting assembly 320 differs from the slot 144 in the mounting assembly 120 in that (a) the slot 344 is in the first body portion 322 as opposed to the second body portion 324, and (b) the slot 344 is not aligned with the first link 341a and, accordingly, movement of the first link 341 is not directly constrained by the slot 344. Rather, the four-bar linkage defined by the first and second links 341a and 341b can move the first body portion 322 relative to the second body portion 324 to define a pivot zone having a plurality of pivot points (not shown). Movement of the first body portion 322 relative to the second body portion 324 can be constrained, at least in part, by the slot 344 and the locking mechanism 346 positioned within the slot 344.

FIG. 4 is an isometric view of an adjustable mounting assembly 420 in accordance with still another embodiment of the invention. The mounting assembly 420 can be generally similar to the mounting assembly 120 described above. For example, the mounting assembly 420 includes a first body portion 422 and a second body portion 424. The first and second body portions 422 and 424 are operably coupled together using a first link 441a and a second link 441b. The first and second links 441a and 441b each include two attachment portions (only three attachment portion 440a-c are shown) to form a four-bar linkage generally similar to the four-bar linkage described above. The mounting assembly 420 differs from the mounting assembly 120, however, in that the second body portion 424 includes two slots 444a and 444b. The first slot 444a is aligned with at least a portion of the first link 441a and the second slot 444b is aligned with at least a portion of the second link 441b. Movement of the first and second links 441a and 441b is accordingly constrained, at least in part, by the first and second slots 444a and 444b. The mounting assembly 420 further includes a first locking mechanism 446a extending through the first link 441a and the first slot 444a and a second locking mechanism 446b extending through the second link 441b and the second slot 444b. The first and second locking mechanisms 446a and 446b can be generally similar to the locking mechanism 146 described above with respect to FIG. 2A.

From the foregoing, it will be appreciated that specific embodiments of the invention have been described herein for purposes of illustration, but that various modifications may be made without deviating from the spirit and scope of the invention. For example, although several specific embodiments of the present invention are particularly useful for adjustably supporting flat panel video displays, the mounting devices and methods of the invention are not limited to video displays and can be applied equally well in other applications including devices adjustably mounted and/or supported by a wall or other support structure. Aspects of the invention described in the context of particular embodiments may be combined or eliminated in other embodiments. Further, while advantages associated with certain embodiments of the invention have been described in the context of these embodiments, other embodiments may also exhibit such advantages, and not all embodiments need necessarily exhibit such advantages to fall within the scope of the invention. Accordingly, the invention is not limited, except as by the appended claims.

The invention claimed is:

1. A mounting assembly for adjustably supporting a flat panel video display, the mounting assembly comprising:
    a first body portion;
    a second body portion;
    a first link and a second link spaced apart from the first link, the first and second links operably coupling the first body portion to the second body portion, wherein the first link and the second link are positioned to cooperatively move relative to each other to pivotably move the first body portion relative to the second body portion;
    a slot extending though at least one of the first and second body portions; and
    a locking mechanism received within the slot to releasably hold the first and second body portions in position relative to each other.

2. The mounting assembly of claim 1 wherein the first body portion, the second body portion, the first link, and the second link move together as a four-bar linkage.

3. The mounting assembly of claim 1, further comprising:
    a first pivot axis extending lengthwise along a medial portion of the first link; and
    a second pivot axis extending lengthwise along a medial portion of the second link and intersecting the first pivot axis at a plurality of pivot points within a pivot zone, the individual pivot points being approximately at a center of gravity of the mounting device and the video display for a particular arrangement of the mounting device and video display.

4. The mounting assembly of claim 1 wherein the second body portion is relatively stationary and the first body portion, the first link, and the second link are pivotably movable relative to the second body portion.

5. The mounting assembly of claim 1 wherein the first link and the second link have the same dimension.

6. The mounting assembly of claim 1 wherein the first link and the second link have a different dimension.

7. The mounting assembly of claim 1 wherein:
the first body portion comprises a first attachment portion and a second attachment portion;
the second body portion comprises a third attachment portion and a fourth attachment portion;
the first link comprises a first attachment member and a second attachment member extending between the first attachment portion of the first body portion and the third attachment portion of the second body portion; and
the second link comprises a third attachment member and a fourth attachment member extending between the second attachment portion of the first body portion and the fourth attachment portion of the second body portion.

8. The mounting assembly of claim 1 wherein:
the slot extends through the second body portion and the first link is aligned with at least a portion of the slot; and
the locking mechanism extends through the first link and the slot such that movement of the first link is constrained at least in part along the slot, and wherein the locking mechanism is positioned to releasably hold the first link in a desired position.

9. The mounting assembly of claim 1 wherein:
the slot extends through the first body portion and is aligned with at least a portion of the second body portion; and
the locking mechanism extends through the slot and at least partially through the first body portion and the second body portion such that movement of the first body portion relative to the second body portion is constrained at least in part by the slot.

10. The mounting assembly of claim 1 wherein the slot is a first slot extending through the second body portion and aligned with at least a portion of the first Link, and the locking mechanism is a first locking mechanism extending through the first link and the first slot such that movement of the first link is constrained along the first slot, and wherein the mounting assembly further comprises:
a second slot extending through the second body portion and spaced apart from the first slot, the second link being aligned with at least a portion of the second slot; and
a second locking mechanism extending through the second link and the second slot such that movement of the second link is constrained along the second slot, and wherein the first and second locking mechanisms are positioned to releasably hold the first body portion in a desired position relative to the second body portion.

11. The mounting assembly of claim 1, further comprising an engagement plate carried by the first body portion and positioned to engage the video display.

12. The mounting assembly of claim 1, further comprising a mounting device attached to a support medium and including one or more mounting arms, wherein at least one of the mounting arms is carrying the mounting assembly.

13. The mounting assembly of claim 1, further comprising the video display.

14. A mounting assembly carried by a mounting device for adjustably mounting a flat panel video display to a support medium, the mounting assembly comprising:
a back plate operably coupled to the mounting device;
a front plate adjacent to the back plate and between the back plate and the video display;
a first pivot arm and a second pivot arm operably coupling the front plate to the back plate, wherein the first and second pivot arms move together to pivotably move the front plate relative to the back plate and define a plurality of pivot points within a pivot zone, the individual pivot points being approximately at a center of gravity point of the video display and the mounting device for a particular configuration of the video display and mounting device;
a first pivot axis extending lengthwise along a medial portion of the first pivot arm; and
a second pivot axis extending lengthwise along a medial portion of the second pivot arm, wherein the first axis intersects the second pivot axis to define the individual pivot points within the pivot zone as the video display moves relative to the support medium.

15. The mounting assembly of claim 14 wherein the back plate operably coupled to the mounting device is relatively stationary and the front plate, first pivot arm, and second pivot arm are pivotably movable relative to the back plate.

16. The mounting assembly of claim 14 wherein the back plate, front plate, first pivot arm, and the second pivot arm together define, at least in part, a four-bar linkage.

17. A mounting assembly carried by a mounting device for adjustably mounting a flat panel video display to a support medium, the mounting assembly comprising:
a back plate operably coupled to the mounting device;
a front plate adjacent to the back plate and between the back plate and the video display;
a first pivot arm and a second pivot arm operably coupling the front plate to the back plate, wherein the first and second pivot arms move together to pivotably move the front plate relative to the back plate and define a plurality of pivot points within a pivot zone, the individual pivot points being approximately at a center of gravity point of the video display and the mounting device for a particular configuration of the video display and mounting device;
a slot extending though the back plate, wherein the first pivot arm is aligned with at least a portion of the slot; and
a locking mechanism extending through the slot and the first pivot arm such that movement of the first pivot arm is constrained at least in part along the slot, and wherein the locking mechanism is positioned to releasably hold the first pivot arm in a desired position.

18. A mounting assembly carried by a mounting device for adjustably mounting a flat panel video display to a support medium, the mounting assembly comprising:
a back plate operably coupled to the mounting device;
a front plate adjacent to the back plate and between the back elate and the video display;
a first pivot arm and a second pivot arm operably coupling the front plate to the back plate. wherein the first and second pivot arms move together to pivotably move the front plate relative to the back plate define a plurality of pivot points within a pivot zone, the individual pivot points being approximately at a center of gravity point of the video display and the mounting device for a particular configuration of the video display and mounting device;
a slot extending through the front plate and aligned with at least a portion of the back plate; and
a locking mechanism extending through the slot and at least partially through the front plate and the back plate such that movement of the front plate relative to the back plate is constrained at least in part by the slot.

19. A mounting assembly carried by a mounting device for adjustably mounting a flat panel video display to a support medium, the mounting assembly comprising:
   a back plate operably coupled to the mounting device;
   a front plate adjacent to the back plate and between the back plate and the video display;
   a first pivot arm and a second pivot arm operably coupling the front plate to the back plate, wherein the first and second pivot arms move together to pivotably move the front plate relative to the back plate and define a plurality of pivot points within a pivot zone, the individual pivot points being approximately at a center of gravity point of the video display and the mounting device for a particular configuration of the video display and mounting device;
   a first slot extending through the back plate and aligned with at least a portion of the first pivot arm;
   a first locking mechanism extending through the first pivot arm and the first slot such that movement of the first pivot arm is constrained along the first slot;
   a second slot extending through the back plate and spaced apart from the first slot, the second pivot arm being aligned with at least a portion of the second slot; and
   a second locking mechanism extending through the second pivot arm and the second slot such that movement of the second link is constrained along the second slot, and wherein the first and second locking mechanisms are positioned to releasably hold the front plate in a desired position relative to the back plate.

20. A method for mounting a flat panel video display, the method comprising:
   releasably attaching a video display to a mounting assembly, the mounting assembly having (a) a first body portion, (b) a second body portion proximate to the first body portion with the first body portion between the video display and the second body portion, and (c) a first link and a second link operably coupling the first body portion to the second body portion; and
   moving the video display to a desired location by pivotably moving the video display about a plurality of pivot points, the individual pivot points being approximately at a center of gravity point for a particular arrangement of the video display and the mounting assembly,
   wherein the mounting assembly further comprises a first pivot axis extending lengthwise along a medial portion of the first link, and a second pivot axis extending lengthwise along a medial portion of the second link and intersecting the first pivot axis.

21. The method of claim 20 wherein moving the video display comprises moving the first body portion, the second body portion, the first link, and the second link together as a four-bar linkage.

22. The method of claim 20 wherein the second body portion is relatively stationary, and wherein moving the video display comprises pivotably moving the first body portion, the first link, and the second link relative to the second body portion.

23. The method of claim 20 further comprising:
   moving the video display comprises pivotably moving the video display about a plurality of pivot points within a pivot zone, the individual pivot points within the pivot zone being at the intersection of the first pivot axis and the second pivot axis as the first body portion and second body portion cooperatively move relative to each other.

24. A method for mounting a flat panel video display, the method comprising:
   releasably attaching a video display to a mounting assembly, the mounting assembly having (a) a first body portion, (b) a second body portion proximate to the first body portion with the first body portion between the video display and the second body portion, and (c) a first link and a second link operably coupling the first body portion to the second body portion; and
   moving the video display to a desired location by pivotably moving the video display about a plurality of pivot points, the individual pivot points being approximately at a center of gravity point for a particular arrangement of the video display and the mounting assembly;
   wherein the mounting assembly further comprises a slot extending though at least one of the first and second body portions, and wherein the method further comprises:
   releasably securing a locking mechanism received within the slot to hold the first and second body portions in position relative to each other after moving the video display to the desired location.

25. A method for mounting a flat panel video display, the method comprising:
   releasably attaching a video display to a mounting assembly, the mounting assembly having (a) a first body portion, (b) a second body portion proximate to the first body portion with the first body portion between the video display and the second body portion, and (c) a first link and a second link operably coupling the first body portion to the second body portion; and
   moving the video display to a desired location by pivotably moving the video display about a plurality of pivot points, the individual pivot points being approximately at a center of gravity point for a particular arrangement of the video display and the mounting assembly;
   wherein the mounting assembly further comprises a slot extending though the second body portion and aligned with at least a portion of the first link, and wherein:
   moving the video display comprises cooperatively moving the first link and the second link to position the video display at a desired viewing location, and wherein the movement of the first link is constrained along the slot.

26. A method for mounting a flat panel video display. the method comprising:
   releasably attaching a video display to a mounting assembly, the mounting assembly having (a) a first body portion, (b) a second body portion proximate to the first body portion with the first body portion between the video display and the second body portion, and (c) a first link and a second link operably coupling the first body portion to the second body portion; and
   moving the video display to a desired location by pivotably moving the video display about a plurality of pivot points, the individual pivot points being approximately at a center of gravity point for a particular arrangement of the video display and the mounting assembly;
   wherein the mounting assembly further comprises a slot extending though the first body portion and aligned with at least a portion of the second body portion, and wherein:
   moving the video display comprises cooperatively moving the first link and the second link to position the video display at a desired viewing location, and wherein the movement of the first body portion is constrained along the slot.

27. A method for mounting a flat panel video display, the method comprising:

releasably attaching a video display to a mounting assembly, the mountinig assembly having (a) a first body portion, (b) a second body portion proximate to the first body portion with the first body portion between the video display and the second body portion, and (c) a first link and a second link operably coupling the first body portion to the second body portion; and moving the video display to a desired location by pivotably moving the video display about a plurality of pivot points, the individual pivot points being approximately at a center of gravity point for a particular arrangement of the video display and the mounting assembly;

wherein the mounting assembly further comprises (a) a first slot extending though the first body portion and aligned with at least a portion of the first link, and (b) a second slot extending through the first body portion and aligned with at least a portion of the second link, and wherein:

moving the video display comprises cooperatively moving the first link and the second link to position the video display at a desired viewing location, and wherein the movement of the first link is constrained along the first slot and the movement of the second link is constrained along the second slot.

28. A method for adjustably mounting a flat panel video display to a support medium, the method comprising:

coupling a video display to a mounting assembly having (a) a back plate, (b) a front plate adjacent to the back plate and between the back plate and the video display, and (c) a first pivot arm and a second pivot arm operably coupling the front plate to the back plate, wherein the first and second pivot arms move together to pivotably move the front plate relative to the back plate; and adjusting the pitch of the video display relative to the support medium by moving the video display about a plurality of pivot points within a pivot zone, wherein the individual pivot points within the pivot zone are approximately at a center of gravity point of the video display and the mounting assembly for a particular configuration of the video display and mounting assembly, wherein the mounting assembly further comprises a first pivot axis extending lengthwise along a medial portion of the first pivot arm, and a second pivot axis extending lengthwise along a medial portion of the second pivot arm, wherein the first pivot axis intersects the second pivot axis to define the individual pivot points within the pivot zone.

* * * * *